US012626119B2

(12) United States Patent
Schwartz et al.

(10) Patent No.: US 12,626,119 B2
(45) Date of Patent: May 12, 2026

(54) TASK-ADAPTIVE ARCHITECTURE FOR FEW-SHOT LEARNING

(71) Applicant: International Business Machines Corporation, Armonk, NY (US)

(72) Inventors: Eliyahu Schwartz, Haifa (IL); Leonid Karlinsky, Mazkeret Batya (IL); Sivan Doveh, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 17/106,114

(22) Filed: Nov. 29, 2020

(65) Prior Publication Data

US 2022/0172036 A1 Jun. 2, 2022

(51) Int. Cl.
 G06N 3/08 (2023.01)
 G06N 3/04 (2023.01)
(52) U.S. Cl.
 CPC ................. G06N 3/08 (2013.01); G06N 3/04 (2013.01)
(58) Field of Classification Search
 CPC .................................... G06N 3/08; G06N 3/04
 See application file for complete search history.

(56) References Cited

U.S. PATENT DOCUMENTS

2018/0285739 A1 10/2018 Wu

OTHER PUBLICATIONS

Zheng, "Efficient Automatic Meta Optimization Search for Few-Shot Learning", Sep. 6, 2019, arXiv.org (Year: 2019).*
Dong, "NATS-Bench: Benchmarking NAS Algorithms for Architecture Topology and Size", Aug. 28, 2020, arXiv.org (Year: 2020).*
Xie, "Meta Module Generation for Fast Few-Shot Incremental Learning", Oct. 2019, ieeexplore.ieee.org (Year: 2019).*
Liu, "DARTS: Differentiable Architecture Search", Jun. 2018, arXig.org (Year: 2018).*
Zhang, Xinbang, et al. "DATA: Differentiable architecture approximation with distribution guided sampling." IEEE Transactions on Pattern Analysis and Machine Intelligence 43.9 (2020): 2905-2920. https://ieeexplore.ieee.org/abstract/document/9181426 (Year: 2020).*
Wang, Jiaxing, et al. "M-nas: Meta neural architecture search." Proceedings of the AAAI Conference on Artificial Intelligence. vol. 34. No. 04. 2020. https://ojs.aaai.org/index.php/AAAI/article/view/6084 (Year: 2020).*

(Continued)

*Primary Examiner* — Michael H Hoang
(74) *Attorney, Agent, or Firm* — Sigalit Portner; Otterstedt & Kammer PLLC

(57) ABSTRACT

Meta-training an artificial neural cell for use in a few-shot learner, wherein the meta-training includes: executing a Neural Architecture Search (NAS) to automatically learn an architecture of the artificial neural cell; training adaptive controllers that are comprised in the architecture of the artificial neural cell, wherein each of the adaptive controllers is configured to adapt the architecture of the artificial neural cell to a few-shot learning task; and regressing the architecture of the artificial neural cell from support data of the few-shot learning task, through the adaptive controllers. Generating the few-shot learner based on the meta-trained artificial neural cell, to form an Artificial Neural Network (ANN).

20 Claims, 6 Drawing Sheets

(56) References Cited

OTHER PUBLICATIONS

Elsken, Thomas, et al. "Meta-Learning of Neural Architectures for Few-Shot Learning." arXiv preprint arXiv:1911.11090 (2019). https://arxiv.org/pdf/1911.11090v2 (Year: 2019).*

Chen, Xin, et al. "Catch: Context-based meta reinforcement learning for transferrable architecture search." Computer Vision—ECCV 2020: 16th European Conference, Glasgow, UK, Aug. 23-28, 2020, Proceedings, Part XIX 16. Springer International Publishing, 2020. (Year: 2020) [Item X continued] https://link.springer.com/chapter/10.1007/978-3-030-58529-7_12.*

Jadon, Shruti, and Aryan Jadon. "An overview of deep learning architectures in few-shot learning domain." arXiv preprint arXiv:2008.06365 (2020). https://arxiv.org/abs/2008.06365 (Year: 2020).*

Choi et al., "Domain-Agnostic Few-Shot Classification by Learning Disparate Modulators," rejected submission to ICLR 2020, online at https://openreview.net/forum?id=S1xjJpNYvB, Sep. 25, 2019.

Elsken et al., "Meta-Learning of Neural Architectures for Few-Shot Learning," arXiv:1911.11090v1 [cs.LG], Nov. 25, 2019.

Lian et al., "Towards Fast Adaptation of Neural Architectures with Meta Learning ," ICLR 2020, online at https://openreview.net/forum?id=r1eowANFvr, Sep. 25, 2019.

Lichtenstein et al., "TAFSSL: Task-Adaptive Feature Sub-Space Learning for few-shot classification," arXiv:2003.06670v1 [cs.CV], Mar. 14, 2020.

Liu et al., "DARTS: Dierentiable Architecture Search," arXiv:1806.09055v2 [cs.LG], Apr. 23, 2019.

Tanaka et al., "Pruning Neural Networks Without Any Data by Iteratively Conserving Synaptic Flow," arXiv:2006.05467v1 [cs.LG], Jun. 9, 2020.

Grace Period Disclosure: Doveh, et al., "MetAdapt: Meta-Learned Task-Adaptive Architecture for Few-Shot Classification", arXiv:1912.00412v1, Dec. 1, 2019, 11 Pages.

Grace Period Disclosure: Doveh, et al., "MetAdapt: Meta-Learned Task-Adaptive Architecture for Few-Shot Classification", arXiv:1912.00412v2, Dec. 3, 2019, 11 Pages.

Grace Period Disclosure: Doveh, et al., "MetAdapt: Meta-Learned Task-Adaptive Architecture for Few-Shot Classification", arXiv:1912.00412v3, Mar. 9, 2020, 18 Pages.

* cited by examiner

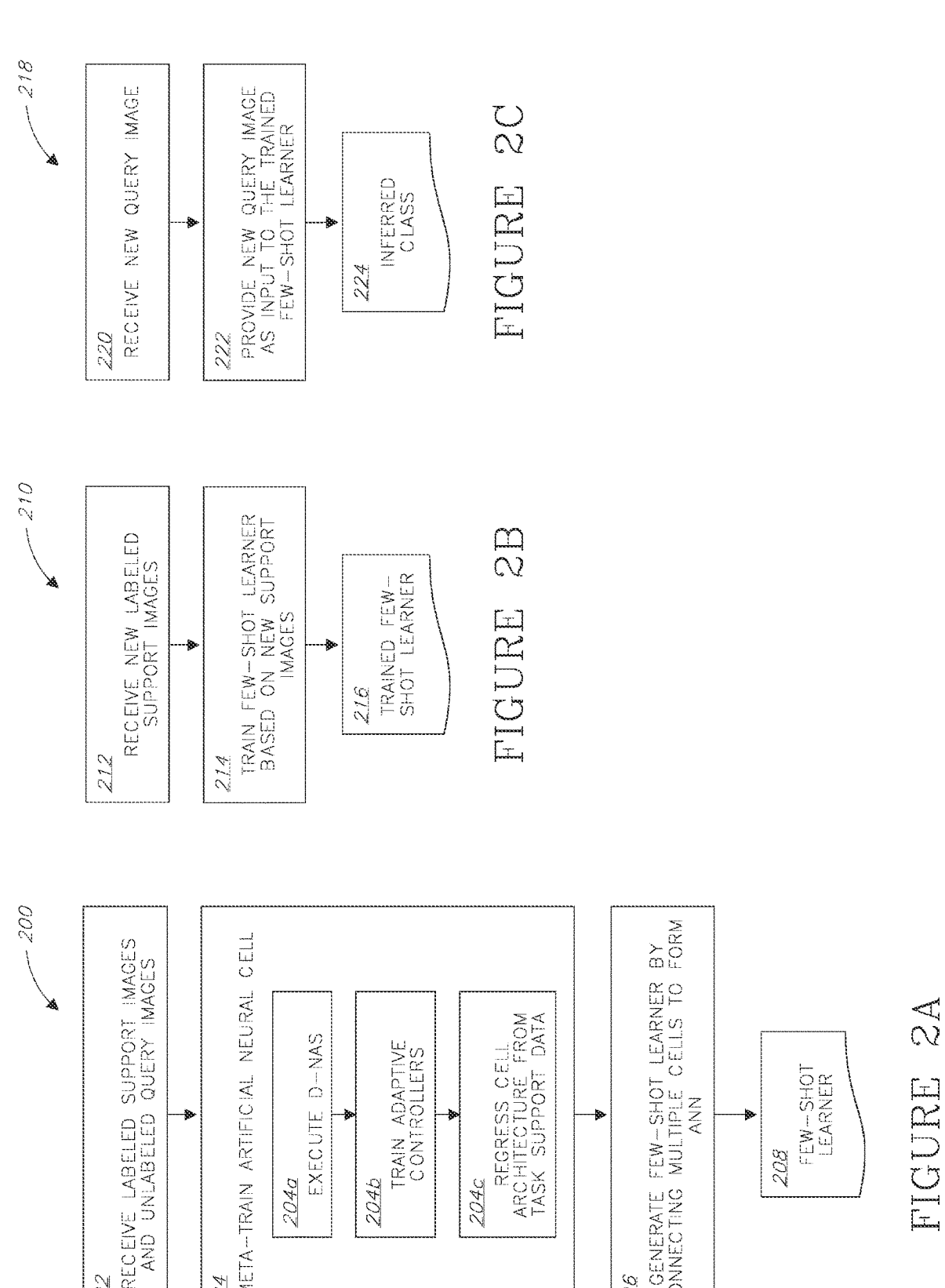

_218_

_220_ RECEIVE NEW QUERY IMAGE

_222_ PROVIDE NEW QUERY IMAGE AS INPUT TO THE TRAINED FEW-SHOT LEARNER

_224_ INFERRED CLASS

_212_ RECEIVE NEW LABELED SUPPORT IMAGES

_214_ TRAIN FEW-SHOT LEARNER BASED ON NEW SUPPORT IMAGES

_216_ TRAINED FEW-SHOT LEARNER

_202_ RECEIVE LABELED SUPPORT IMAGES AND UNLABELED QUERY IMAGES

_204_ META-TRAIN ARTIFICIAL NEURAL CELL

_204a_ EXECUTE D-NAS

_204b_ TRAIN ADAPTIVE CONTROLLERS

_204c_ REGRESS CELL ARCHITECTURE FROM TASK SUPPORT DATA

_206_ GENERATE FEW-SHOT LEARNER BY CONNECTING MULTIPLE CELLS TO FORM ANN

_208_ FEW-SHOT LEARNER

FIGURE 2A

TASK-ADAPTIVE ARCHITECTURE FOR FEW-SHOT LEARNING

BACKGROUND

The invention relates to the field of few-shot learning, a type of machine learning.

Few-shot learning (FSL) in general, and few-shot classification (FSC) in particular, have seen much progress recently. Few-shot learning involves situations where inference has to be made on the basis of only a handful of examples, as opposed to the traditional requirement in machine learning to learn from a vast number of examples, typically in the hundreds or thousands. In different FSC applications, label complexity ranges from image-level class labels ('classification'), to labeled bounding boxes ('detection'), to labeled pixel masks ('segmentation').

A popular approach in FSC is meta-learning, or 'learning-to-learn.' In meta-learning, the inputs are not images per-se, but instead a set of few-shot tasks, $\{T_i\}$, each K-shot/N-way task containing a small amount K (usually 1-5, possibly a few more) of labeled support images and some amount of unlabeled query images for each of the N categories (or 'classes') of the task. The goal of meta-learning is to find a base model that can transfer well to tasks built from novel, previously-unseen categories, in which only a small amount of examples per category is available. For example, using few-shot classification, a base model that was meta-learned from images of dogs, cats, and birds, may be transferred to a task in which images of bears and rodents (the novel categories) require classification.

While many different FSL methods have been proposed, one of the key factors leading to higher FSL performance is surprisingly simple—the backbone neural network architecture used to embed the images of the few-shot tasks. While first works on FSL resorted to small architectures with just a few convolution layers, recent works show that large architectures pre-trained on the training portion of FSL datasets produce strong features that are more easily transferable to novel few-shot tasks.

Hand-in-hand with the growing sophistication of FSC methods, some general factors affecting their performance have become apparent. One such factor is the Convolutional Neural Network (CNN) backbone architecture at the basis of modern FSC methods. So far, in many of the FSC approaches, the backbone architectures were chosen rather arbitrarily by re-using the most popular modern classification architectures. Under this setup, meta-learning only seeks the best transferable parameters, while the backbone architecture itself remains pre-determined and fixed. Few approaches have actually made an attempt to optimize the backbone architecture used for FSC, leaving much to be desired. There still remains a need for effective meta-learning-based methods that enable a learned architecture to adapt itself to novel few-shot tasks.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method comprising: Meta-training an artificial neural cell for use in a few-shot learner, wherein the meta-training includes: executing a Neural Architecture Search (NAS) to automatically learn an architecture of the artificial neural cell; training adaptive controllers that are comprised in the architecture of the artificial neural cell, wherein each of the adaptive controllers is configured to adapt the architecture of the artificial neural cell to a few-shot learning task; and regressing the architecture of the artificial neural cell from support data of the few-shot learning task, through the adaptive controllers. Generating the few-shot learner based on the meta-trained artificial neural cell, to form an Artificial Neural Network (ANN).

Another embodiment provides a system comprising: (a) at least one hardware processor; and (b) a non-transitory computer-readable storage medium having program code embodied therewith, the program code executable by said at least one hardware processor to: Meta-train an artificial neural cell for use in a few-shot learner, wherein the meta-training includes: executing a Neural Architecture Search (NAS) to automatically learn an architecture of the artificial neural cell; training adaptive controllers that are comprised in the architecture of the artificial neural cell, wherein each of the adaptive controllers is configured to adapt the architecture of the artificial neural cell to a few-shot learning task; and regressing the architecture of the artificial neural cell from support data of the few-shot learning task, through the adaptive controllers. Generate the few-shot learner based on the meta-trained artificial neural cell, to form an Artificial Neural Network (ANN).

A further embodiment provides a computer program product comprising a non-transitory computer-readable storage medium having program code embodied therewith, the program code executable by at least one hardware processor to: Meta-train an artificial neural cell for use in a few-shot learner, wherein the meta-training includes: executing a Neural Architecture Search (NAS) to automatically learn an architecture of the artificial neural cell; training adaptive controllers that are comprised in the architecture of the artificial neural cell, wherein each of the adaptive controllers is configured to adapt the architecture of the artificial neural cell to a few-shot learning task; and regressing the architecture of the artificial neural cell from support data of the few-shot learning task, through the adaptive controllers. Generate the few-shot learner based on the meta-trained artificial neural cell, to form an Artificial Neural Network (ANN).

In some embodiments, said generating of the few-shot learner comprises connecting multiple ones of the meta-trained artificial neural cell, to form the ANN.

In some embodiments, the method further comprises, or the program code is further executable for: training the few-shot learner in a new few-shot learning task, wherein, in said training of the few-shot learner, the adaptive controllers adapt the architecture of the meta-trained artificial neural cell to the new few-shot learning task.

In some embodiments, said training of the few-shot learner is devoid of fine-tuning.

In some embodiments, the NAS is a Differentiable NAS (D-NAS).

In some embodiments, the architecture of the artificial neural cell comprises an adaptive block structured as a Directed Acyclic Graph (DAG) having nodes and edges, in which: each of the nodes defines a feature map calculated as a combination of those of the edges which are directed at the respective node; each of the edges is associated with a respective one of the adaptive controllers; and each of the edges defines a mixed operation controlled by the respective adaptive controller.

In some embodiments, each of the mixed operations comprises: multiple search space operations; and a mixing coefficient of the multiple search space operations.

In some embodiments, said meta-training further comprises optimizing the mixing coefficient; and said training of the adaptive controllers comprises optimizing a modifier that is configured to modify the mixing coefficient respective of the few-shot learning task, so as to enhance performance of the few-shot learning task.

In some embodiments, each of the adaptive controllers uses Global Average Pooling (GAP) and applies a Multi-Layer Perceptron (MLP) to produce the modifier.

Additional embodiments provide a method, a system, and a computer program product, in which the following steps are performed, optionally using at least one hardware processor: Training a few-shot learner in a new few-shot learning task, wherein: The few-shot learner is an ANN that comprises adaptive controllers that adapt an architecture of an artificial neural cell of the ANN to the new few-shot learning task. The artificial neural cell is a meta-trained artificial neural cell whose training comprises: executing a Neural Architecture Search (NAS) to automatically learn the architecture of the artificial neural cell; training the adaptive controllers that are comprised in the architecture of the artificial neural cell; and regressing the architecture of the artificial neural cell from support data of the few-shot learning task, through the adaptive controllers. The training of the few-shot learner in the new few-shot learning task is optionally devoid of fine-tuning.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 2A is a flowchart of a method for generating a few-shot learner having a certain transferable base model, according to an embodiment.

FIG. 2B is a flowchart of a method for training the generated few-shot learner in a novel few-shot classification task, according to an embodiment.

FIG. 2C is a flowchart of a method for making inference on a new query sample using the trained few-shot learner, according to an embodiment.

DETAILED DESCRIPTION

Figure 1:
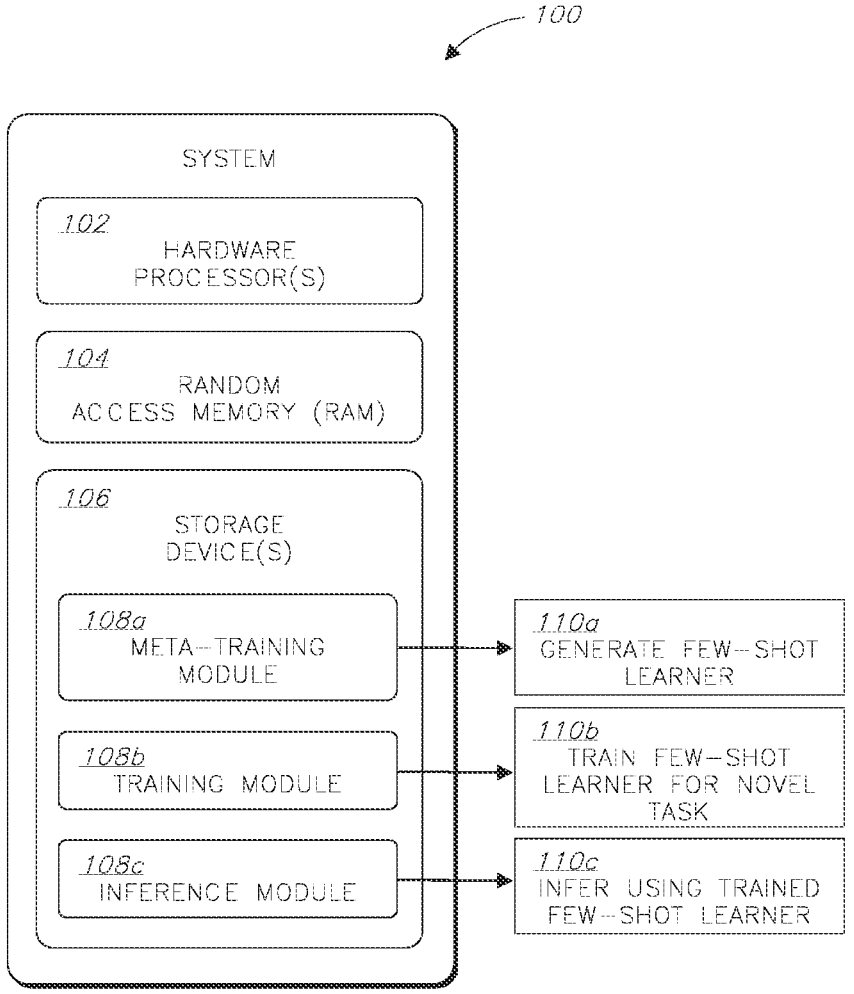
FIG. 1 is a block diagram of an exemplary system for few-shot learning, according to an embodiment.

Disclosed herein is a method, system, and computer-program product for generating a few-shot learner configured to adapt an architecture of its artificial neural cells to any novel (also 'new') few-shot learning task. Advantageously, an artificial neural cell may be meta-trained by executing a Neural Architecture Search (NAS), or more specifically a Differentiable NAS (D-NAS), to automatically learn an architecture of the artificial neural cell, while also training adaptive controllers that are comprised in the architecture and are configured to adapt it to the novel few-shot learning task. The few-shot learner may then be generated by stacking, or recursively connecting, multiple meta-trained artificial neural cells, to form an operable Artificial Neural Network (ANN). It is also possible, in some scenarios, to use just a single meta-trained artificial neural cell in the ANN. Later, as the few-shot learner is trained in a novel few-shot learning task, the adaptive controllers adapt the architecture of the meta-trained artificial neural cells to this novel task, to enhance performance of subsequent inference using the trained learner. In one option, the training in the novel task is devoid of fine-tuning, while still yielding good performance at inference time.

The ANN forming the few-shot learner may be, for example, a CNN, a Recurrent Neural Network (RNN), a transformer, or any other type of neural network to which the teachings of present embodiments can be readily applied by those skilled in the art. While a convolutional architecture (of a CNN) may enable use of the present method for few-shot image classification, detection, and/or segmentation tasks, a recurrent architecture (of an RNN) or a transformer architecture, for example, may allow using the method for various few-shot prediction (also "inference") tasks which process sequential input data, such as Natural Language Processing (NLP) tasks, or tasks in which prediction is made based on audio and/or video input, to name a few examples. Namely, the present few-shot learner may be configured to make inference on the basis of one of various input modalities, such as images, audio streams, video streams, texts, etc. For simplicity of presentation, however, image classification using a convolutional architecture is used along the majority of the ensuing discussion to exemplify embodiments of the invention. Those of skill in the art will readily recognize how to adapt these examples to tasks involving other input modalities, using either convolutional architectures, recurrent architectures, transformer architectures, or other ANN architectures.

This disclosure, in some embodiments thereof, provides a method to use meta-learning to jointly optimize parameters and backbone architecture, for best transferability to novel few-shot tasks. Moreover, the disclosure expands the common notion of what a transfer of the model entails. Besides fine-tuning (both parameters and architecture) on the novel task's support set, the present method may include predictive modules that learn to directly regress the necessary changes ('re-wiring') to the architecture, to best adapt it to the novel task. Employing these modules, a different architecture adapted to every new task may be obtained. The adapted architecture may then serve as a better starting point for a standard transfer, fine-tuning on the support set. As discussed in the Experimental Results section below, this may result in significant performance gains.

The approach taken by present embodiments may meta-learn not only the FSL's model parameters but also its architecture optimized for the FSL, while incorporating components allowing to regress modifications to the architecture directly from the task support data.

Reference is now made to FIG. 1, which shows a block diagram of an exemplary system 100 for few-shot learning, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as: a meta-training module 108a configured to generate a few-shot learner 110a; a training module 108b configured to train the generated few-shot learner in a novel few-shot learning task 110b; and an inference module 108c configured to use the trained few-shot learner for inference on a query sample 110c belonging to novel categories from the novel few-shot learning task. The software components may include an operating system having various software components and/or drivers for controlling and managing general system tasks (e.g., memory management, storage device control, power management, etc.), and facilitating communication between various hardware and software components.

System 100 may operate by loading instructions of one or more of modules 108a-108c into RAM 104 to be executed by processor(s) 102. These instructions may cause system 100 to receive any support and/or query samples required as input to any of modules 108a-108c, to perform any requisite processing, and to generate respective output.

System 100, as described herein, is only an exemplary embodiment of the present invention, and in practice may be implemented in hardware only, software only, or a combination of both hardware and software. In addition, system 100 may have more or fewer components and modules than shown, may combine two or more of the components, or may have a different configuration or arrangement of the components.

System 100 may include any additional component enabling it to function as an operable computer system, such as a motherboard, data busses, power supply, a network interface card, a display, an input device (e.g., keyboard, pointing device, touch-sensitive display), etc. (not shown), as those of skill in the art will recognize. Moreover, components of system 100 may be co-located or distributed, and/or the system may be configured to run as one or more cloud computing "instances," "containers," "virtual machines," or other types of encapsulated software applications, as known in the art.

In some embodiments, system 100 may be implemented as multiple separate systems (not shown), each including a different one of modules 108a-108c in conjunction with that system's own processor(s), RAM, storage device(s), and/or other components as described above. It is also possible for such separate system to include two out of the three modules 108a-108c.

The instructions of meta-training module 108a, training module 108b, and inference module 108c, are now discussed with reference to the flow charts of FIGS. 2A, 2B, and 2C, respectively. Various specific technical aspects of these instructions are then discussed with reference to the diagrams of FIGS. 3-6. In some embodiments, steps carried out by these instructions are performed automatically (e.g., by system 100 of FIG. 1), unless a step is specifically stated to involve manual action.

FIG. 2A shows a flow chart of a method 200 for generating a few-shot learner having a certain transferable base model.

In step 202, labeled support images and unlabeled query images may be received, such as 1-5 or up to 10 labeled support images, and a similar or a greater number of unlabeled query images. The labels may denote the category (class) of the support images, such as 'cat,' 'dog,' 'person,' 'car,' 'flower,' or the like, although it is customary to construct a base model from closely-related categories (namely, those coming from the same 'visual domain'), for example just from animal categories or just from vehicle categories.

Then, meta-learning commences. This may include meta-training 204 an artificial neural cell (hereinafter simply "cell") which will later be used in the few-shot learner. The meta-training may be performed in the conventional manner, namely—over groups termed 'episodes' (or sometimes 'tasks') $\{T_i\}$, which are each designed to mimic the eventual novel few-shot task. Each of these tasks may include K labeled support images and some amount of unlabeled query images (out of the images received in step 202) for each of N categories.

Advantageously, the meta-training may include a combination of the following: execution 204a of a NAS, such as a D-NAS (for example as in Liu, H. et al., "DARTS: Dierentiable Architecture Search," in International Conference on Learning Representations (ICLR) 2019), to automatically learn an architecture of the cell; training 204b of adaptive controllers that are comprised in the architecture of the cell, where each of these adaptive controllers is configured to adapt the architecture of the cell to a few-shot learning task (initially—the tasks of the meta-training, and later—the tasks in which the novel categories are learned); regression 204c of the architecture of the cell from support data of the few-shot learning task (namely, the support images, or more precisely—their extracted feature vectors), through the adaptive controllers.

Once a meta-trained cell is obtained by step 204, the few-shot learner 208 may be generated 206 by connecting multiple ones of the meta-trained cell to form an ANN, such as stacking the cells to form a CNN or recursively connecting them to form an RNN, as the case may be. The cells may also be referred to as 'layers' of the ANN. The forming of the ANN may additionally include any conventional actions needed to make it an operable ANN.

The generated few-shot learner 208 may thus comprise a certain transferable base model, such as a base model covering various animal species whose images were included in the support and query images received in step 202.

In one possible business scenario, method 200 may be performed by an entity (e.g., a corporation) with the expertise and resources to generate and provide many different few-shot learners to its customers. For example, that entity may repeatedly perform method 200, each time for a different set of N categories, to produce many few-shot learners applicable to different uses by the customers. For instance, one few-shot learner may be applicable to flower species few-shot classification tasks usable by botanical research institutes, and another few-shot learner to car model few-shot classification tasks usable by law enforcement agencies. The customers obtaining these few-shot learners may then more easily train them in novel few-shot classification tasks, such as to classify additional species of flowers or additional models of cars—unseen at the time of meta-training the respective few-shot learners. This training is now discussed with reference to FIG. 2B, which illustrates a flow chart of a method 210 for training the few-shot learner (generated by method 200 of FIG. 2A) in a novel few-shot classification task.

In step 212, new support images, labeled with one or more novel categories, may be received. For example, these new support images may be of previously unseen flower species or car models, as per the previous example. The number of new support images may be, for example, between 1-5 or up to 10 images per novel category.

In step 214, the ANN which serves as the few-shot learner may be trained on the basis of the new support images, such that the base model is transferred to a new model configured to later classify images according to the novel categories. Once a trained few-shot learner 216 is obtained by step 214, it may serve for inference as discussed with reference to the next figure.

FIG. 2C, to which reference is now made, shows a flow chart of a method 218 for making inference on a new query sample using the trained few-shot learner 216.

In step 220, a new query sample may be received—one which potentially belongs in one of the novel categories. For instance, following on in the previous examples, this may be a flower image acquired by a botany researcher or a car image acquired by a roadside camera.

In step 222, the new query sample may be provided as input to the trained few-shot learner 216, such that this trained learner may infer a class 224 to which the new query sample belongs—possibly one of the novel classes.

Again, although methods 200, 210, and 218 are exemplified on an image classification task, these methods may equally be applicable to other inference types, such as object detection, object segmentation, or those pertaining to language modeling.

Additional aspects of these methods are now discussed with reference to FIGS. 3 through 6.

Figure 3:
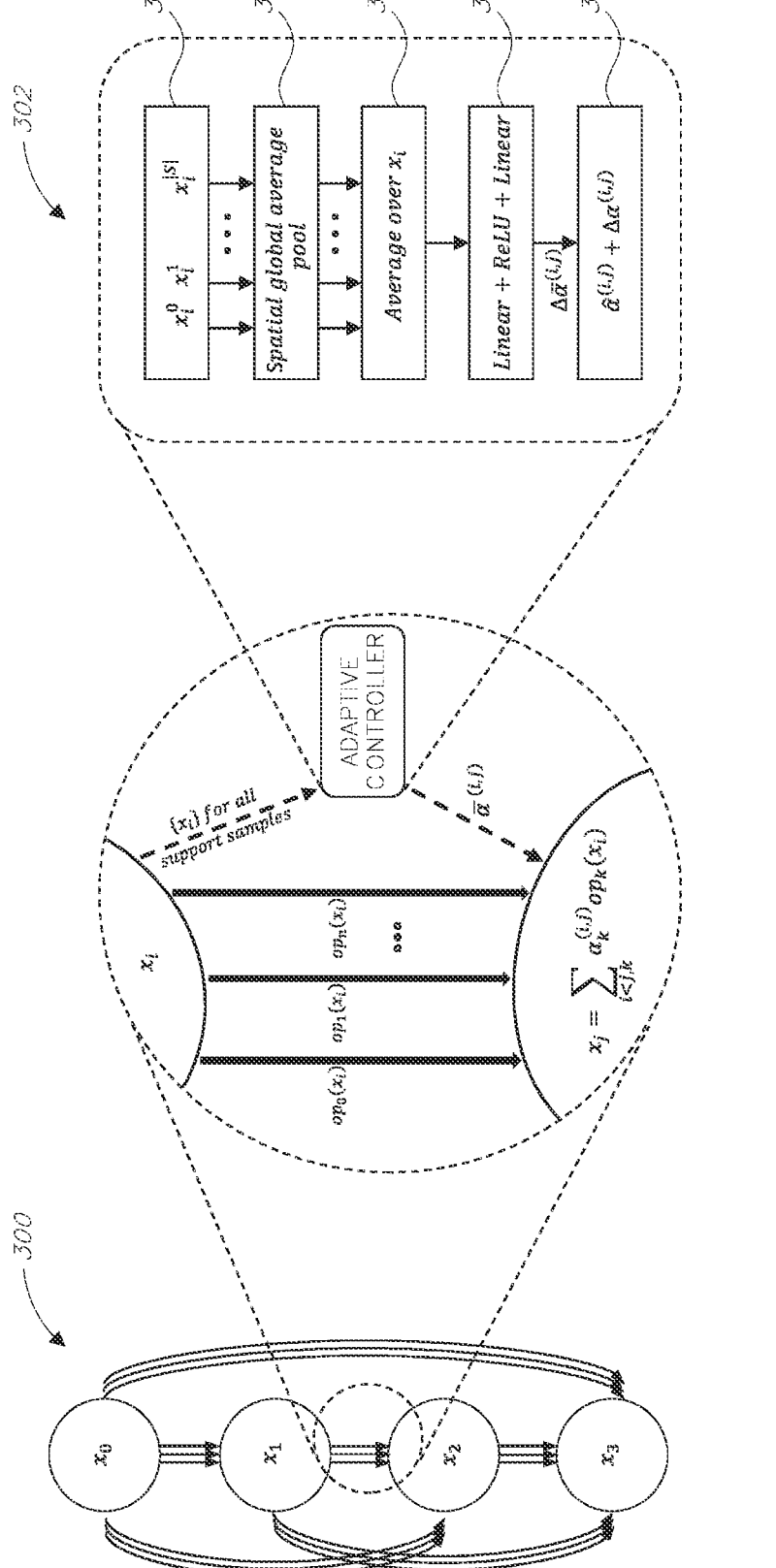
FIG. 3 is a diagram of an architecture of an artificial neural cell, according to an embodiment.

FIG. 3 shows a diagram of an architecture of the aforementioned cell, identified here by reference numeral 300, which may be meta-trained for use as an adaptive layer in a few-shot learner, according to an embodiment. Cell 300, also referred to herein as a 'task-adaptable block' or sometimes simply as a 'block,' may be structured as a Directed Acyclic Graph (DAG) with adaptable connections configured to modulate the architecture, adapting it to the few-shot task at hand—be it any of the few-shot tasks of various episodes of the meta-training, or any novel few-shot task introduced subsequently. Cell 300 may include sub-modules, referred to herein as 'adaptive controllers' 302, that are configured to receive a digest of the current task (in the form of feature maps) in order to predict the changes in connectivity inside the cell that can benefit the task.

Cell 300 may be constructed from feature maps $V=\{x_i\}$ (nodes, illustrated as circles) that are linked by mixtures of operations (edges, each illustrated as multiple arrows interconnecting a pair of nodes). An initial, input feature map to cell 300 is denoted $x_0$ and its output is denoted $x_{|V|-1}$. A mixed operation, $\bar{o}^{(i,j)}$, may be defined as $$\bar{o}^{(i,j)}(x) = \frac{\Sigma_{o\in\mathcal{O}} \exp(\alpha_o^{(i,j)}) o(x)}{\Sigma_{o\in\mathcal{O}} \exp(\alpha_o^{(i,j)})}, \tag{1}$$

where $\mathcal{O}$ is a set of the search space operations, o(x) is an operation applied to x, and $\alpha_o^{(i,j)}$ is an optimised coefficient for operation o at edge (i, j). Further below it is described how $\alpha$'s may be adapted per each task (the task being a K-shot, N-way episode of the meta-learning) in a predictive manner (feed-forward only). An exemplary, non-exhaustive list of search space operations is provided in Table 1. The list includes, inter alia, those zero-operation and identity-operation that can fully or partially (depending on the corresponding $\alpha_o^{(i,j)}$) cut the connection or make it a residual one (skip-connection).

TABLE 1

| List of possible operations on each edge | |
|---|---|
| Operation ID | Layers |
| zero | The zero operation - cut connection |
| skip | The identity operation - skip connect |
| mean3 | Average Pool $3 \times 3 \rightarrow$ BN |
| max3 | Max Pool $3 \times 3 \rightarrow$ BN |
| conv1 | Cony $1 \times 1 \rightarrow$ BN |
| conv5$_+$ | Cony $5 \times 5 \rightarrow$ BN $\rightarrow$ LeakyReLU(0.1) |
| conv5 | Cony $5 \times 5 \rightarrow$ BN |
| conv3$_+$ | Cony $3 \times 3 \rightarrow$ BN $\rightarrow$ LeakyReLU(0.1) |
| conv3 | Cony $3 \times 3 \rightarrow$ BN |

Each feature map $x_i$ in cell 300 may be connected to all previous maps by setting it to be:

$$x_i = \Sigma_{j<i} \bar{o}^{(i,j)}(x_j). \tag{2}$$

Cell 300 may be appended to any conventional, backbone feature extractor that is configured to generate the feature maps V. Optionally, more than one cell 300 is used, such as two, three, or even more such cells. As discussed in the Experimental Results section below, one exemplary configuration includes a ResNet9 ANN followed by a single task-adaptive block with 4 nodes (|V|=4), but other configurations are of course possible and explicitly intended herein. Note that, as that exemplary configuration uses four nodes in the block, there exists a single path in the search space that is a regular residual block (ResNet3 block), making ResNet12 a special case of the disclosed configuration.

Advantageously, cell 300 may be equipped with a set of adaptive controllers 302, one per edge, used to predict (in a feed-forward computation) the architecture changes needed to adapt the cell to a given few-shot task. For simplicity of illustration, adaptive controller 302 is shown in FIG. 3 only between the two middle nodes, but an instance of such adaptive controller may exist between every pair of nodes $x_i$, $x_j$. The function of adaptive controllers 302 may be to process the current task, regressing from it those changes to the edge operations mixing coefficients $\alpha_o^{(i,j)}$ that will benefit the task.

Let $\alpha^{(i,j)}$ be the vector of all $\alpha_o^{(i,j)}$, and let $\hat{\alpha}^{(i,j)}$ be the globally optimized coefficients (according to the optimization process described below). Then, adaptive controllers 302 predict the task-specific residuals $\Delta\alpha^{(i,j)}$, which comprise a vector of modification to $\hat{\alpha}^{(i,j)}$ that will further tune the architecture of cell 300 towards improved performance on the current task (a few-shot episode). Eventually, $$\alpha^{(i,j)} = \hat{\alpha}^{(i,j)} + \Delta\alpha^{(i,j)} \tag{3}$$

are the final task-adapted coefficients used for the mixed operation calculations, defined in Equation 1, of each edge (i, j).

The architecture for each adaptive controller 302, predicting $\Delta\alpha^{(i,j)}$, may be as follows: As input, the adaptive controller may receive 302a the input feature maps $x_i$ of the corresponding edge (i, j) computed for all samples in a support set S of the current few-shot episode. A support set, as known in the art, may include multiple samples, each being an image, a text, a video sequence, an audio sequence, or any other digital piece of information. The samples in the support set may belong to various different categories.

For a support set of size |S|, number of channels D (e.g., RGB channels of an image), and feature map spatial resolution M×M, the full input to each adaptive controller 302 is a tensor of dimensions (|S|, D, M, M).

Next, each adaptive controller 302 may perform spatial global average pooling 302b to obtain an (|S|, D)-sized tensor, immediately followed by average over the support set 302c, resulting in a tensor of size D. Finally, a 2-layer Multi-Layer Perceptron (MLP, with two linear layers and ReLU activation) may be applied 302d, to output 302e the predicted $\Delta\alpha^{(i,j)}$.

Figure 4:
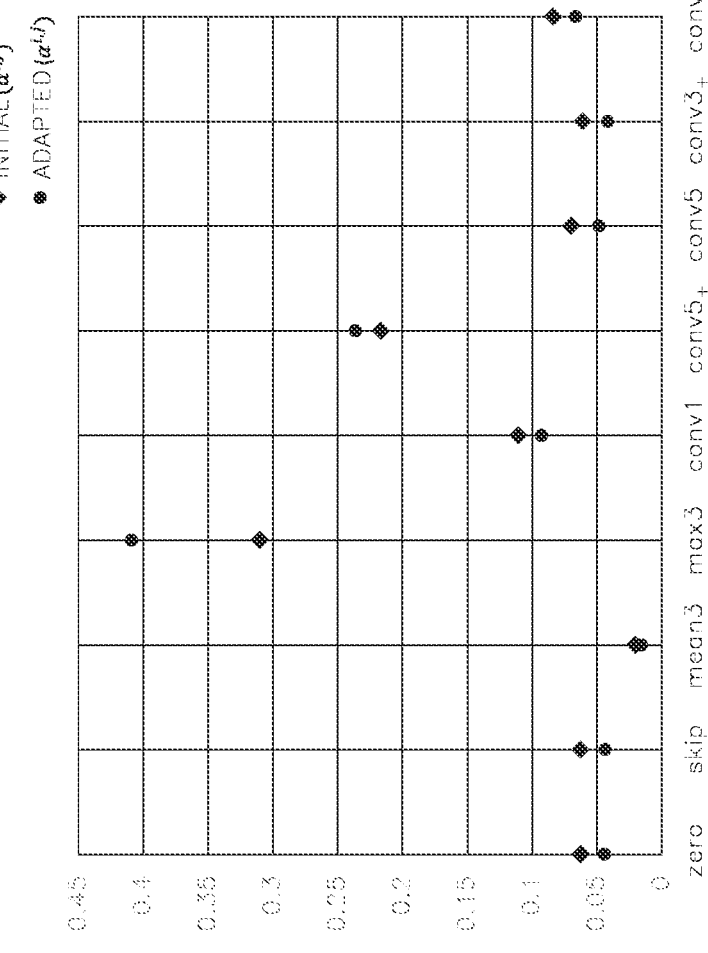
FIG. 4 is a graph illustrating an example of global $\hat{\alpha}^{(i,j)}$ and $\alpha^{(i,j)}$ before and after adaptation for a specific few-shot episode, according to an embodiment.
Figure 5B:
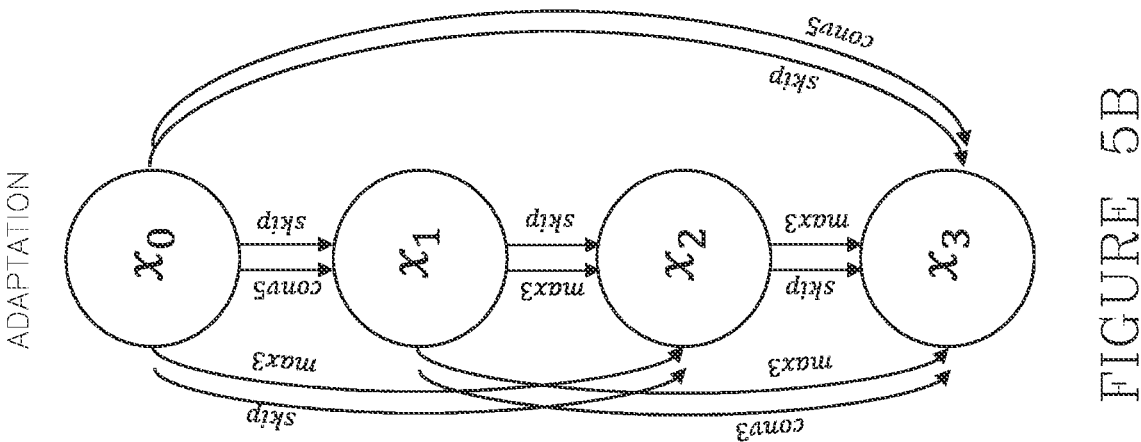
FIGS. 5A and 5B are diagrams visualizing an optimized cell architecture, with top operations after search visualized in FIG. 5A and operations predicted by adaptive controllers visualized in FIG. 5B, according to an embodiment.
Figure 5A:
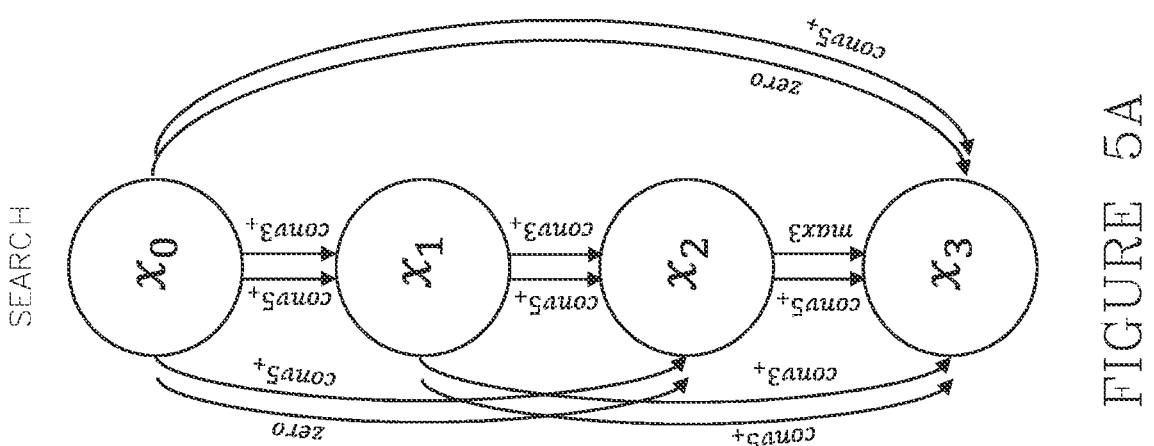

FIG. 4, to which reference is now made, is a graph illustrating an example of global $\hat{\alpha}^{(i,j)}$ and $\alpha^{(i,j)}$ before and after the adaptation made by adaptive controller 302 for a specific few-shot episode. FIGS. 5A and 5B, in turn, visualize an optimized cell architecture: For each edge, the top-2 operations are visualized. On the left, in FIG. 5A, are the top operations after search ($\hat{\alpha}$). On the right, in FIG. 5B, are the operations predicted by adaptive controllers 302 to be the most important for a specific random task, and were accorded the highest extra weighting ($\Delta\alpha$). As seen in these visualizations, the predicted task-specific changes to the graph structure can sometimes be quite significant.

To meta-train cell 300, bi-level iterative optimization may be used, intermittently switching between optimizing the operations' weights w and optimizing the operations mixing coefficients $\alpha$, similar to Liu 2019. A training set for this meta-training may be randomly split into two subsets: $train_w$ for weights training, and $train_\alpha$ for training the $\alpha$'s. Iteratively optimizing w and $\alpha$ to convergence is prohibitively slow. Accordingly, as in Liu 2019, w may be optimized with a standard Stochastic Gradient Descent (SGD):

$$w = w - \mu \nabla_w \text{Loss}_{train_w}(w, \alpha), \qquad (4)$$

where $\mu$ is the learning rate. The $\alpha$'s may be optimized using SGD with a second-order approximation of the model after convergence of w, by applying:

$$\alpha = \alpha - \eta \nabla_\alpha \text{Loss}_{train_\alpha}(w - \mu \text{Loss}_{train_w}(w, \alpha), \alpha), \qquad (5)$$

where n is the learning rate for a. The adaptive controller 302 parameters may be trained as a final step, with all other parameters frozen, using SGD on the entire training set for a single epoch.

Optionally, fine-tuning of $\alpha$ is performed when training the one-shot learner on a support set of a novel task. This may include performing horizontal flip augmentation (or any other suitable type of augmentation), effectively doubling the number of support set, and fine-tuning $\alpha$ for 10 iterations where the horizontally-flipped support set serves as a labeled query set. The effects of augmentation and fine-tuning are further discussed below, in the Experimental Results section.

In some embodiments, however, fine-tuning is not at all performed while training for a novel task, because the cell's architecture is already task-optimized through adaptive controllers 202, and fine-tuning can gain little or no performance improvement at the expense of valuable computing time. In addition, fine-tuning often requires significant computational resources in order to complete it in a reasonable time, which is prohibitive if the novel task training is to be performed by an edge device, such as a personal computer, a smart phone, or a computing/imaging system incorporated in a field-operated machine such as an autonomous vehicle, to name a few examples. Accordingly, an embodiment which is devoid of fine-tuning in the training for a novel task may be highly advantageous in certain scenarios.

Optionally, pruning of parameters is performed in a pre-processing stage independent of a specific dataset or a specific loss function, to reduce a size of the model found through D-NAS. The pruning may be performed, for example, according to the technique in Tanaka, H. et al., "Pruning Neural Networks Without Any Data By Iteratively Conserving Synaptic Flow," arXiv:2006.05467 [cs.LG], 2020, to estimate parameter importance before training the few-shot learner and to mask out the less important parameters during training and inference. This pruning technique may be applied to both any ResNet layer(s) and the adaptive layers (those made of the meta-trained task-adaptive blocks).

In some embodiments, however, pruning is not at all performed, because the cell's architecture is already task-optimized through adaptive controllers 302, and pruning can gain little or no performance improvement at the expense of valuable computing time, or can even negatively affect performance.

Figure 6:
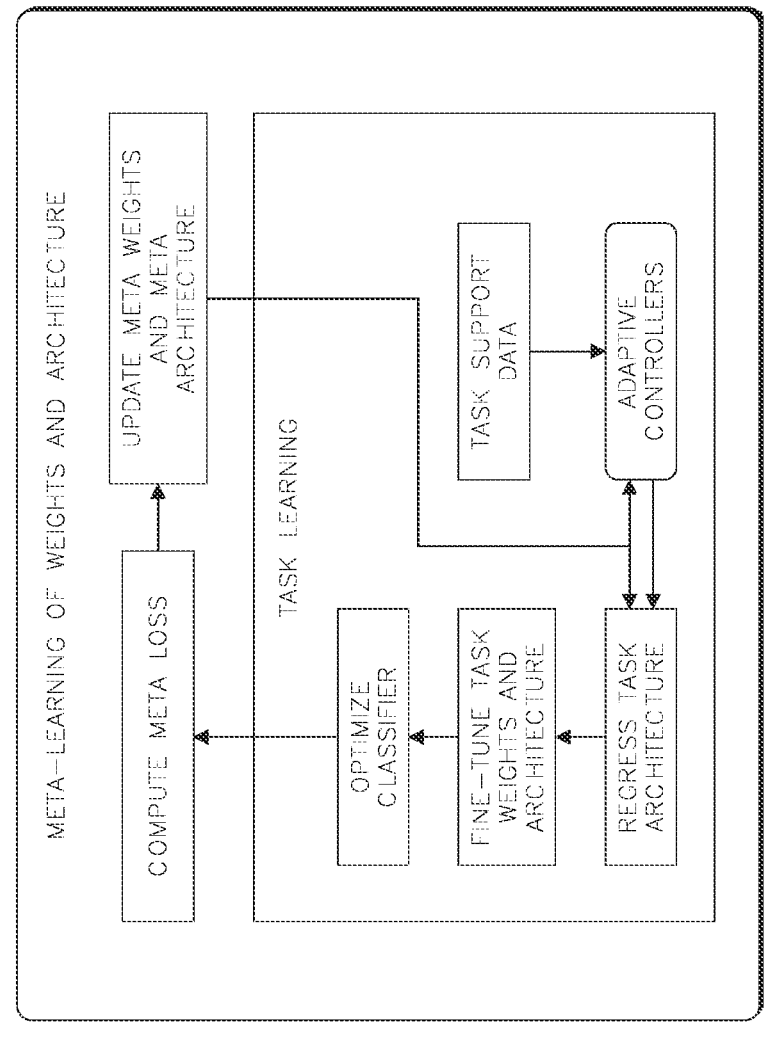
FIG. 6 is a process diagram showing an overview of a meta-training process, according to an embodiment.

Reference is now made to FIG. 6, which shows an overview of the above-described meta-training in a process diagram. As shown, architecture modifications may be regressed directly from the task support data (using the adaptive controllers) prior to fine-tuning; furthermore, base architecture and regression may be meta-learned jointly.

Experimental Results

The popular miniImageNet and FC100 datasets were used as benchmarks to evaluate the performance of the present method against various state-of-the-art methods.

The miniImageNet dataset (Vinyals, O. et al., "Matching Networks for One Shot Learning," in Advances in Neural Information Processing Systems 29 (NIPS) 2016) is a standard benchmark for few-shot image classification, that has 100 randomly-chosen classes from ILSVRC-2012 (Russakovsky, O. et al., "ImageNet Large Scale Visual Recognition Challenge," in International Journal of Computer Vision 115 (2015) pp. 211-252). These classes are randomly split into 64 meta-training, 16 meta-validation, and 20 meta-testing classes. Each class has 600 images of size 84×84. The present experiments utilized the same class splits as in Lee, K. et al., "Meta-Learning with Differentiable Convex Optimization," in IEEE/CVF Conference on Computer Vision and Pattern Recognition (CVPR) 2019, pp. 10657-10665, and various other works.

The FC100 dataset (Oreshkin, B. N., et al., "TADAM: Task dependent adaptive metric for improved few-shot learning," in Advances in Neural Information Processing Systems 33 (NIPS) 2020) is constructed from the CIFAR-100 dataset (Krizhevsky, A., "Learning Multiple Layers of Features from Tiny Images," Online at https://www.cs.toronto.edu/~kriz/learning-features-2009-TR.pdf, last viewed Nov. 7, 2020), and contains 100 classes that are grouped into 20 super-classes. These are in turn partitioned into 60 classes from 12 super-classes for meta-training, 20 classes from 4 super-classes for meta-validation, and 20 classes from 4 super-classes for meta-testing. This minimizes the semantic overlap between classes of different splits. Each class contains 600 images of size 32×32.

To implement the present method, the SVM classifier head proposed in MetaOptNet (Lee 2019) was used. Meta-training began with training a ResNet12 backbone on the training set of the relevant dataset, for 60 epochs. Then, the last residual block of the ResNet12 backbone was replaced with the present task-adaptive block, keeping the first 3 ResNet blocks (ResNet9) fixed and performing the architecture search for 10 epochs. Finally, the adaptive controllers were trained for a single epoch. Each epoch included 8000 episodes with mini-batch size of 4 episodes.

For the initial training, the SGD optimizer was used with initial learning rate=0.1, momentum=0.9 and weight decay=$5 \cdot 10^{-4}$. The learning rate was decreased to 0.006 at epoch 20, 0.0012 at epoch 40, and 0.00024 at epoch 50. For weights optimization during the search and meta adaptation phases, the SGD optimizer was used with learning rate=0.001, momentum=0.9, and weight decay=$5 \cdot 10^{-4}$. For the architecture optimization, an Adam optimizer was used, with learning rate=$3 \cdot 10^{-4}$, $\beta$=[0.5, 0.99], weight decay=$10^{-3}$ and the Cosine Annealing learning rate scheduler with $\eta_{min}$=0.004.

Tables 2 and 3 compare the performance of the present method with the following prominent, state-of-the-art, few-shot classification methods:

MatchingNets: Vinyals (2016); and Chen, W. Y., et al., "A Closer Look At Few-Shot Classification," in ICLR 2019, pp. 1-16.

MAML: Finn, C., et al., "Model-Agnostic Meta-Learning for Fast Adaptation of Deep Networks," arXiv: 1703.03400v3 [cs.LG], 2017; and Chen (2019).

ProtoNet: Snell, J., et al., "Prototypical Networks for Few-shot Learning," Advances in Neural Information Processing Systems 30 (NIPS 2017); and Chen (2019).

RelationNet: Sung, F., et al., "Learning to Compare: Relation Network for Few-Shot Learning," arXiv: 1711.06025v2 [cs.CV], 2018; and Chen (2019).

Auto-Meta: Kim, J., et al, "Auto-Meta: Automated Gradient Based Meta Learner Search," arXiv:1806.06927v2 [cs.LG], 2018.

Baseline: Chen (2019).

Baseline++: Chen (2019).

SNAIL: Mishra, N., et al, "A Simple Neural Attentive Meta-Learner," Advances in Neural Information Processing Systems (NIPS), 2016.

Dynamic Few-shot: Gidaris, S., et al., "Dynamic few-shot visual learning without forgetting," in Proceedings of the IEEE Conference on Computer Vision and Pattern Recognition 2018, pp. 4367-4375.

AdaResNet: Munkhdalai, T., et al, "Meta Networks," arXiv:1703.00837v2 [cs.LG], 2017.

TADAM: Oreshkin, B. N., et al., "TADAM: Task dependent adaptive metric for improved few-shot learning," $32^{nd}$ Conference on Neural Information Processing Systems (NeurIPS 2018).

A2P: Qiao, S., et al., "Few-shot image recognition by predicting parameters from activations," in Proceedings of the IEEE Conference on Computer Vision and Pattern Recognition 2018, pp. 7229-7238.

Δ-Encoder: Schwartz, E., et al., "Δ-encoder: an effective sample synthesis method for few-shot object recognition," $32^{nd}$ Conference on Neural Information Processing Systems (NeurIPS 2018).

wDAE: Gidaris, S., et al., "Generating classification weights with gnn denoising autoencoders for few-shot learning," in Proceedings of the IEEE Conference on Computer Vision and Pattern Recognition 2019, pp. 21-30.

MetaNAS: Elsken, T., et al., "Meta-Learning of Neural Architectures for Few-Shot Learning," arXiv:1911.11090v1 [cs.LG], 2019.

LEO: Rusu, A. A., et al., "Meta-Learning with Latent Embedding Optimization," in ICLR 2019.

MetaOptNet: Lee (2019).

BF3S: Gidaris, S., et al., "Boosting few-shot visual learning with self-supervision," in Proceedings of the IEEE International Conference on Computer Vision 2019.

Robust-dist: Dvornik, N., et al., "Diversity with cooperation: Ensemble methods for few-shot classification," in The IEEE International Conference on Computer Vision 2019.

TABLE 2

| Few-shot miniImageNet 5-way accuracy | | | | |
| --- | --- | --- | --- | --- |
| Method | Architecture | No. of parameters | miniImageNet 1-shot | 5-shot |
| MatchingNets | ResNet10 | 5M | 54.49 | 68.82 |
| MAML | ResNet10 | 5M | 54.69 | 66.62 |
| ProtoNet | ResNet18 | 12M | 54.16 | 73.68 |
| RelationNet | ResNet18 | 12M | 52.48 | 69.83 |
| Auto-Meta | — | — | 51.16 | 69.18 |
| Baseline | ResNet10 | 5M | 52.37 | 74.69 |
| Baseline++ | ResNet10 | 5M | 53.97 | 76.16 |
| SNAIL | ResNet12 | 12M | 55.71 | 68.88 |
| Dynamic Few-shot | WResNet28 | 36M | 56.20 | 73.00 |
| AdaResNet | — | — | 56.88 | 71.94 |
| TADAM | ResNet12 | 12M | 58.50 | 76.70 |
| A2P | WResNet28 | 36M | 59.60 | 73.74 |
| Δ-Encoder | ResNet18 | 12M | 59.90 | 69.70 |
| wDAE | WResNet28 | 36M | 61.07 | 76.75 |
| MetaNAS | DAG | 1M | 61.70 | 78.80 |
| LEO | WResNet28 | 36M | 61.76 | 77.52 |
| MetaOptNet | ResNet12 | 12M | 62.64 | 78.63 |
| BF3S | WResNet28 | 36M | 62.93 | 79.87 |
| Robust-dist | ResNet18 | 12M | 63.06 | 80.63 |
| Present method (pruned) | | 1.3M | 64.05 | 79.97 |
| Present method (non-pruned) | | 130M | 64.80 | 80.64 |

TABLE 3

| Few-shot CIFAR-100 (FC100) 5-way accuracy | | | | |
| --- | --- | --- | --- | --- |
| Method | Architecture | No. of parameters | FC100 1-shot | 5-shot |
| ProtoNet | ResNet18 | 12M | 37.50 | 52.50 |
| TADAM | ResNet12 | 12M | 40.10 | 56.10 |
| MetaOptNet | ResNet12 | 12M | 41.37 | 55.30 |
| Present method (pruned) | | 3.1M | 44.11 | 58.07 |
| Present method (non-pruned) | | 130M | 44.83 | 58.47 |

The results are reported here as the average accuracy over 1000 episodes with 75 query images per episode (15 per class). The 95% confidence intervals for all of the results were around 0.6%. As can be observed, the present method performed superiorly for both datasets in 1- and 5-shot 5-way classification. For example, compared to the MetaOptNet baseline, improved results were obtained for FC100 1-shot (+3.46%) and 5-shot (+3.17%), as well as for miniImageNet 1-shot (+1.74%) and 5-shot (+2.01%).

Importantly, the present method showed considerable gains over MetaNAS, which, despite relying on NAS, does not base its fine-tuning on each task's support data.

Another aspect which was tested experimentally is pruning. The performance of the present method, with and without pruning, is apparent at the bottom of, in Table 2. It was found that the model of the present method can be pruned by two orders of magnitude losing only around 0.8% accuracy, which is still comparable to state-of-the-art performance (higher for 1-shot, lower for 5-shot) yet significantly more efficient in terms of parameters (and consequently, computation time). This is likely due to the amount of redundancy in the full, unpruned version of the present model.

Table 4 compares the pruned version of the present model versus pruned MetaOptNet (ResNet12). Despite the fact that these models were both pruned to have a similar number of parameters, the present model does not lose performance as much as MetaOptNet, indicating that it is likely better to have a model with many operations but pruned to have a low number of parameters, than a model with fewer operations but more (or a similar number of) parameters.

TABLE 4

Pruning effect on MetaOptNet versus the present method

| Method | Pruned | No. of parameters | Accuracy |
|---|---|---|---|
| MetaOptNet (Fixed ResNet 12 architecture) | 55 | 12M | 61.77 |
| Present method | 51 | 1.2M | 59.41 |
| | 55 | 130M | 64.80 |
| | 51 | 1.3M | 64.05 |

In the experiments discussed above, each described action, value, parameter, or other technical characteristic utilized in any of the experiments, is considered an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A method comprising operating at least one hardware processor to:
   meta-train an artificial neural cell for use in a few-shot learner, wherein said meta-training comprises:

executing a Neural Architecture Search (NAS) to automatically learn an architecture of the artificial neural cell,
   training adaptive controllers that are comprised in the architecture of the artificial neural cell, wherein each of the adaptive controllers is configured to adapt the architecture of the artificial neural cell to a few-shot learning task by re-wiring the architecture, wherein the rewiring of the architecture comprises effectively changing a corresponding directed acyclic graph of operations within the artificial neural cell, and
   regressing the architecture of the artificial neural cell from support data of the few-shot learning task, through the adaptive controllers; and
   generate the few-shot learner based on the meta-trained artificial neural cell, to form an Artificial Neural Network (ANN).

2. The method of claim 1, further comprising adapting the architecture of the meta-trained artificial neural cell to a new few-shot learning task, wherein said generating of the few-shot learner comprises connecting multiple ones of the meta-trained artificial neural cell having an adapted architecture, to form the ANN.

3. The method of claim 1, further comprising:
   adapting the architecture of the meta-trained artificial neural cell to a new few-shot learning task.

4. The method of claim 3, further comprising training the few-shot learner in a new few-shot learning task, wherein said training of the few-shot learner is devoid of fine-tuning.

5. The method of claim 1, wherein the NAS is a Differentiable NAS (D-NAS).

6. The method of claim 5, wherein the architecture of the artificial neural cell comprises an adaptive block structured as a Directed Acyclic Graph (DAG) having nodes and edges, in which:
   each of the nodes defines a feature map calculated as a combination of those of the edges which are directed at the respective node;
   each of the edges is associated with a respective one of the adaptive controllers; and
   each of the edges defines a mixed operation controlled by the respective adaptive controller.

7. The method of claim 6, wherein each of the mixed operations comprises:
   a set of search space operations; and
   a mixing coefficient of the multiple search space operations.

8. The method of claim 7, wherein:
   said meta-training further comprises optimizing the mixing coefficient; and
   said training of the adaptive controllers comprises optimizing a modifier that is configured to modify the mixing coefficient respective of the few-shot learning task, so as to enhance performance of the few-shot learning task.

9. The method of claim 8, wherein:
   each of the adaptive controllers uses Global Average Pooling (GAP) and applies a Multi-Layer Perceptron (MLP) to produce the modifier.

10. A system comprising:
   (a) at least one hardware processor; and
   (b) a non-transitory computer-readable storage medium having program code embodied therewith, the program code executable by said at least one hardware processor to:
      meta-train an artificial neural cell for use in a few-shot learner, wherein the meta-training comprises:

executing a Neural Architecture Search (NAS) to automatically learn an architecture of the artificial neural cell, training adaptive controllers that are comprised in the architecture of the artificial neural cell, wherein each of the adaptive controllers is configured to adapt the architecture of the artificial neural cell to a few-shot learning task by re-wiring the architecture, wherein the rewiring of the architecture comprises effectively changing a corresponding directed acyclic graph of operations within the artificial neural cell, and regressing the architecture of the artificial neural cell from support data of the few-shot learning task, through the adaptive controllers; and generate the few-shot learner based on the meta-trained artificial neural cell, to form an Artificial Neural Network (ANN).

11. The system of claim 10, wherein the program code is further executable to:

adapt the architecture of the meta-trained artificial neural cells to a new few-shot learning task.

12. The system of claim 11, wherein the program code is further executable to train the few-shot learner in a new few-shot learning task, wherein said training of the few-shot learner is devoid of fine-tuning.

13. The system of claim 10, wherein the NAS is a Differentiable NAS (D-NAS).

14. The system of claim 13, wherein the architecture of the artificial neural cell comprises an adaptive block structured as a Directed Acyclic Graph (DAG) having nodes and edges, in which:

each of the nodes defines a feature map calculated as a combination of those of the edges which are directed at the respective node;

each of the edges is associated with a respective one of the adaptive controllers; and each of the edges defines a mixed operation controlled by the respective adaptive controller.

15. The system of claim 14, wherein each of the mixed operations comprises:

a set of search space operations; and a mixing coefficient of the multiple search space operations.

16. The system of claim 15, wherein:

said meta-training further comprises optimizing the mixing coefficient; and said training of the adaptive controllers comprises optimizing a modifier that is configured to modify the mixing coefficient respective of the few-shot learning task, so as to enhance performance of the few-shot learning task.

17. The system of claim 16, wherein:

each of the adaptive controllers uses Global Average Pooling (GAP) and applies a Multi-Layer Perceptron (MLP) to produce the modifier.

18. A computer program product comprising a non-transitory computer-readable storage medium having program code embodied therewith, the program code executable by at least one hardware processor to:

meta-train an artificial neural cell for use in a few-shot learner, wherein said meta-training comprises:

executing a Neural Architecture Search (NAS) to automatically learn an architecture of the artificial neural cell, training adaptive controllers that are comprised in the architecture of the artificial neural cell, wherein each of the adaptive controllers is configured to adapt the architecture of the artificial neural cell to a few-shot learning task by re-wiring the architecture, wherein the rewiring of the architecture comprises effectively changing a corresponding directed acyclic graph of operations within the artificial neural cell, and regressing the architecture of the artificial neural cell from support data of the few-shot learning task, through the adaptive controllers; and generate the few-shot learner based on the meta-trained artificial neural cell, to form an Artificial Neural Network (ANN).

19. The computer program product of claim 18, wherein the program code is further executable to:

adapt the architecture of the meta-trained artificial neural cells to a new few-shot learning task.

20. The computer program product of claim 19, wherein the program code is further executable to train the few-shot learner in a new few-shot learning task, wherein said training of the few-shot learner is devoid of fine-tuning.

* * * * *